US012667859B2

(12) United States Patent
Liang et al.

(10) Patent No.: US 12,667,859 B2
(45) Date of Patent: Jun. 30, 2026

(54) ALL-PLASTIC PRESSING PUMP

(71) Applicant: MAJESTY HOLDINGS CO., LTD., Guangdong (CN)

(72) Inventors: Peihui Liang, Guangdong (CN); Maoyong Zhu, Guangdong (CN); Yonglei Zhang, Guangdong (CN); Jinkao Liang, Guangdong (CN)

(73) Assignee: MAJESTY HOLDINGS CO., LTD., Zhongshan (CN)

( * ) Notice: Subject to any disclaimer, the term of this patent is extended or adjusted under 35 U.S.C. 154(b) by 177 days.

(21) Appl. No.: 18/564,564

(22) PCT Filed: Dec. 27, 2021

(86) PCT No.: PCT/CN2021/141602
§ 371 (c)(1),
(2) Date: Nov. 27, 2023

(87) PCT Pub. No.: WO2022/252593
PCT Pub. Date: Dec. 8, 2022

(65) Prior Publication Data

US 2024/0253072 A1 Aug. 1, 2024

(30) Foreign Application Priority Data

May 31, 2021 (CN) ......................... 202110603998.4

(51) Int. Cl.
*B05B 11/10* (2023.01)

(52) U.S. Cl.
CPC ...... *B05B 11/1001* (2023.01); *B05B 11/1047* (2023.01); *B05B 11/1067* (2023.01); *B05B 11/1074* (2023.01); *B05B 11/1076* (2023.01)

(58) Field of Classification Search
CPC ............. B05B 11/1035; B05B 11/1074; B05B 11/028; B05B 11/1001; B05B 11/1047;
(Continued)

(56) References Cited

U.S. PATENT DOCUMENTS

2009/0283548 A1* 11/2009 Hummel ............. B05B 11/1077 222/340
2017/0326567 A1* 11/2017 Santagiuliana ..... B05B 11/1001

FOREIGN PATENT DOCUMENTS

CN 204896181 U 12/2015
CN 109896145 A 6/2019
(Continued)

OTHER PUBLICATIONS

Translation—CN 211887509 U.*
(Continued)

*Primary Examiner* — David P Angwin
*Assistant Examiner* — Christopher S. Parisi
(74) *Attorney, Agent, or Firm* — LOZA & LOZA, LLP; Michael Fedrick

(57) ABSTRACT

Disclosed in the invention is an all-plastic pressing pump comprising: an actuator, an insert, a housing, a container cap, a piston guide, a pump ball, a spring, and a protective cover, made of plastic. The lower end of the piston guide is provided with a slidable sealing part that is inserted into the housing and slidably and sealing connected to the inner wall of the housing. The container cap has a central hole for the piston guide to pass through. A conical frustum sealing part is provided on the piston guide above the slidable sealing part, and the conical frustum sealing part forms a sealed connection with the side wall of the central hole when it bounces up. An air replenishment channel is disposed between the housing and the container cap. A liquid outlet channel and a switch structure are disposed between the actuator and the piston guide, and the switch structure opens the liquid outlet channel when the actuator is pressed down and blocks the liquid outlet channel when the actuator bounces up. A guide sleeve is provided on the top of the container cap and is upwardly sleeved on the outer side of the actuator. An anti-off protrusion is provided at the upper
(Continued)

end of the guide sleeve. The actuator is provided with an anti-off hook that is capable of being hooked on the anti-off protrusion. The spring is disposed inside the guide sleeve and is pressed between the top of the actuator and the top of the container cap. The spring is a plastic spring tube with open upper and lower ends and a sealed side, and the structure thereof is simple.

4 Claims, 2 Drawing Sheets

(58) Field of Classification Search
CPC ............ B05B 11/1076; B05B 11/1067; B05B 11/0044; B05B 11/1077; B05B 11/1039; B05B 11/1066; F16F 1/025; F16F 1/373; F16F 1/3732; F16F 1/376; F16F 1/44
USPC ...................................... 222/321.7, 401, 633
See application file for complete search history.

(56) References Cited

FOREIGN PATENT DOCUMENTS

| | | | | | |
|---|---|---|---|---|---|
| CN | 111746929 | A | | 10/2020 | |
| CN | 211887509 | U | * | 11/2020 | ........... B05B 11/007 |
| CN | 212386936 | U | | 1/2021 | |
| CN | 113212965 | A | | 8/2021 | |
| CN | 215099331 | U | | 12/2021 | |
| JP | H1076196 | A | | 3/1998 | |

OTHER PUBLICATIONS

Translation: CN-211887509-U (Year: 2020).*
International Search Report issued for International Application No. PCT/CN2021/141602 dated Apr. 1, 2022 in 6 pages.

* cited by examiner

ALL-PLASTIC PRESSING PUMP

The present application claims priority to Chinese Patent Application No. 202110603998.4, entitled "ALL-PLASTIC PRESSING PUMP", filed with the Chinese Patent Office on May 31, 2021, which is hereby incorporated by reference in its entirety.

TECHNICAL FIELD

The invention relates to an all-plastic pressing pump.

BACKGROUND

Nowadays, due to the requirements of environmental protection, more and more pressing pumps are made of all-plastic parts. However, current all-plastic pressing pumps are complicated in structure or have some shortcomings, such as poor sealing or inadequate elasticity.

The invention has been made in view of this situation.

SUMMARY

The purpose of the invention is to overcome the shortcomings of the prior art and provide an all-plastic pressing pump with a simple structure.

The invention is implemented through the following technical solutions.

An all-plastic pressing pump comprises an actuator, an insert, a housing, a container cap, a piston guide, a pump ball, a spring, and a protective cover, made of plastic. The upper end of the housing is fixed on the container cap, and the lower end of the piston guide is provided with a slidable sealing part that is inserted into the housing and slidably and sealing connected to the inner wall of the housing. The container cap has a central hole for the piston guide to pass through. A conical frustum sealing part is provided on the piston guide above the slidable sealing part, and the conical frustum sealing part forms a sealed connection with the side wall of the central hole when it bounces up. An air replenishment channel communicating the interior of the container cap and an upper port of the housing is disposed between the housing and the container cap. The actuator is connected to the upper end of the piston guide. A liquid outlet channel leading from the housing to the insert is disposed between the actuator and the piston guide. A switch structure is disposed between the actuator and the piston guide, which opens the liquid outlet channel when the actuator is pressed down and blocks the liquid outlet channel when the actuator bounces up. A guide sleeve is provided on the top of the container cap and is upwardly sleeved on the outer side of the actuator. An inward-protruding anti-off protrusion is provided at the upper end of the guide sleeve. The actuator is provided with an anti-off hook that protrudes outward and is capable of being hooked on the anti-off protrusion when pulled upwards. The protective cover is covered on the outer sides of the guide sleeve and the actuator and is in snap-fit with the outer side of the guide sleeve. The spring is disposed inside the guide sleeve and is pressed between the top of the actuator and the top of the container cap. The spring is a plastic spring tube with open upper and lower ends and a sealed side, and the plastic spring tube has a spiral structure, rotating in a left or right direction.

For the all-plastic pressing pump as mentioned above, the actuator is provided with a hollow plug connecting rod and a socket located outside the plug connecting rod. The plug connecting rod is inserted into the piston guide and slidably and sealing connected to the inner wall of the piston guide. A pull rod is fixed within the piston guide and is inserted into the plug connecting rod. The switch structure comprises an inverted conical frustum piston disposed at the upper end of the pull rod. An inward-protruding convex ring is provided within the plug connecting rod. An outward-flipped inverted conical flanging is provided at the upper end of the piston guide. The inverted conical flanging is inserted into the socket and is capable of moving up and down within the socket. The socket is provided therein with an annular convex strip that is capable of preventing the inverted conical flanging from falling off the socket from below. When the actuator bounces up, the convex ring is stuck under the inverted conical frustum piston to form a seal, and the annular convex strip is stuck under the inverted conical flanging to form a seal. During the process of pressing down the actuator, the actuator moves downwards and causes the convex ring to detach from the inverted conical frustum piston to open the liquid outlet channel, and after the actuator moves downward for a certain distance, the actuator presses against the inverted conical flanging to push the piston guide to move downwards together.

For the all-plastic pressing pump as mentioned above, the convex ring is formed at a vertical junction between an inverted conical frustum bore and a conical frustum bore, which are vertically connected.

For the all-plastic pressing pump as mentioned above, the upper end of the spring is provided with an annular opening, while the lower end thereof is provided with a downward-facing annular cover. The actuator is provided with a position-limiting post that is inserted into the annular opening to restrict a lateral movement of the upper end of the spring. The container cap is provided with a position limiting conical frustum for buckling the annular cover on the outer side of the position limiting conical frustum to restrict a lateral movement of the lower end of the spring.

For the all-plastic pressing pump as mentioned above, a plurality of inward-protruding ribs are circumferentially provided on the inner wall of the annular cover, and the ribs press against the position limiting conical frustum to form a gap between the lower end of the annular cover and the position limiting conical frustum for the entry of external gas.

For the all-plastic pressing pump as mentioned above, a pump ball seat for installing the pump ball is disposed of within the housing, and a plastic diptube is connected below the housing.

The invention has the following advantages over the prior art.

1. All members of the invention are made of plastic materials, which are environmentally friendly, safe, and recyclable. Additionally, the overall structure is simple and easy to manufacture.
2. The invention adopts a spring that is integrally connected on the side, which has good elasticity. Furthermore, the spring is externally disposed outside the housing, so as to better facilitate quantitative pumping of the material.

BRIEF DESCRIPTION OF THE DRAWINGS

Specific embodiments of the invention will be further described in detail with reference to the accompanying drawings, in which.

DETAILED DESCRIPTION

The invention will be further described below with reference to the accompanying drawings.

Figure 1:
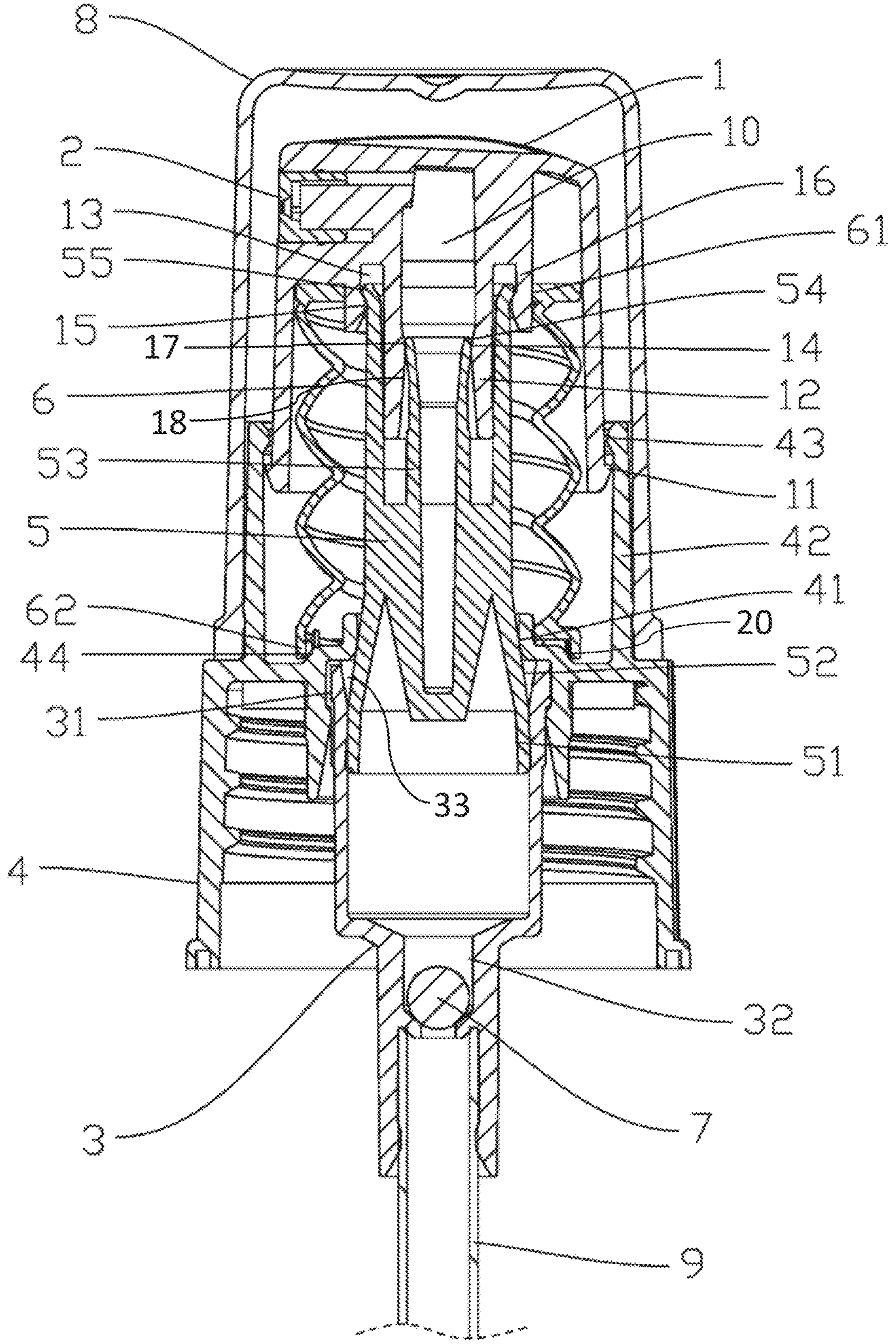
FIG. 1 is a sectional view of an all-plastic pressing pump of the invention.
Figure 2:
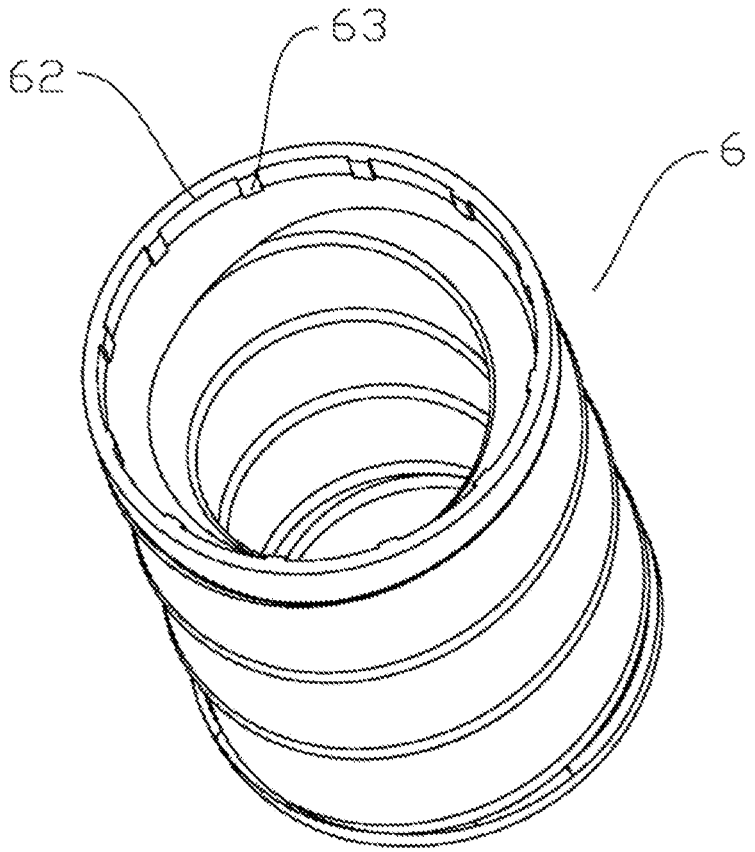
FIG. 2 is a schematic structural diagram of a spring.

As shown in FIGS. 1-2, an all-plastic pressing pump comprises an actuator 1, an insert 2, a housing 3, a container cap 4, a piston guide 5, a pump ball 7, a spring 6, and a protective cover 8, made of plastic. The upper end of housing 3 is fixed on the container cap 4, and the lower end of the piston guide 5 is provided with a slidable sealing part 51 inserted into housing 3 and slidably and sealing connected to the inner wall of housing 3. The container cap 4 has a central hole 41 for the piston guide 5 to pass through, a conical frustum sealing part 52 is provided on the piston guide 5 above the slidable sealing part 51, and the conical frustum sealing part 52 forms a sealed connection with the side wall of the central hole 41 when it bounces up. An air replenishment channel 31 communicating the interior of container cap 4 and an upper port 33 of housing 3 is disposed between housing 3 and container cap 4. The actuator 1 is connected to the upper end of the piston guide 5, and a liquid outlet channel 10 leading from housing 3 to insert 2 is disposed between the actuator 1 and the piston guide 5. A switch structure is disposed between the actuator 1 and the piston guide 5, which opens the liquid outlet channel 10 when the actuator 1 is pressed down and blocks the liquid outlet channel 10 when the actuator 1 bounces up. The container cap 4 is provided on the top thereof with a guide sleeve 42 that is upwardly sleeved on the outer side of the actuator 1. An inward-protruding anti-off protrusion 43 is provided at the upper end of the guide sleeve 42, and the actuator 1 is provided with an anti-off hook 11 that protrudes outward and is capable of being hooked on the anti-off protrusion 43 when pulled upwards. The protective cover 8 is covered on the outer sides of the guide sleeve 42 and the actuator 1 and is in snap-fit with the outer side of the guide sleeve 42. The spring 6 is disposed inside guide sleeve 42 and is pressed between the top of actuator 1 and the top of container cap 4. The spring 6 is a plastic spring tube with open upper and lower ends and a sealed side, the spring 6 is integrally connected on the side and has good elasticity, it has an all-plastic structure, which is safe and environmentally friendly, and the structure is simple.

The actuator 1 is provided with a hollow plug connecting rod 12 and a socket 13 located outside the plug connecting rod 12. The plug connecting rod 12 is inserted into the piston guide 5 and slidably and sealed connected to the inner wall of the piston guide. A pull rod 53 is fixed within the piston guide 5 and is inserted into the plug connecting rod 12. The switch structure comprises an inverted conical frustum piston 54 disposed at the upper end of the pull rod 53. An inward-protruding convex ring 14 is provided within the plug connecting rod 12. An outward-flipped inverted conical flanging 55 is provided at the upper end of the piston guide 5. The inverted conical flanging 55 is inserted into the socket 13 and is capable of moving up and down within the socket 13. Socket 13 is provided therein with an annular convex strip 15 that is capable of preventing the inverted conical flanging 55 from falling off socket 13 from below. When the actuator 1 bounces up, the convex ring 14 is stuck under the inverted conical frustum piston 54 to form a seal to block the liquid outlet channel 10, and the annular convex strip 15 is stuck under the inverted conical flanging 55 to form a seal. During the process of pressing down the actuator 1, the actuator 1 moves downwards and causes the convex ring 14 to detach from the inverted conical frustum piston 54 to open the liquid outlet channel 10, and after the actuator 1 moves downwards for a certain distance, it presses against the inverted conical flanging 55 to push the piston guide 5 to move downwards together. The contents in housing 3 are pumped out through the liquid outlet channel 10 and sprayed out as mist after atomization by insert 2.

A pump ball seat 32 for installing pump ball 7 is disposed of within housing 3, and a plastic diptube 9 is connected below housing 3.

The convex ring 14 is formed at a vertical junction between an inverted conical frustum bore 17 and a conical frustum bore 18, which is vertically connected, forming, from bottom to top, a channel that gradually decreases to a minimum and then immediately gradually increases in size, to enhance ejection effect of the contents when pressed down.

The upper end of the spring 6 is provided with an annular opening 61, while the lower end thereof is provided with a downward-facing annular cover 62. The actuator 1 is provided with a position limiting post 16 that is inserted into the annular opening 61 to restrict a lateral movement of the upper end of the spring 6. The container cap 4 is provided with a position limiting conical frustum 44 for buckling the annular cover 62 on the outer side of the position limiting conical frustum to restrict the lateral movement of the lower end of the spring 6, so that the position of the spring 6 is fixed, and the spring pressing stability is improved.

A plurality of inward-protruding ribs 63 are circumferentially provided on the inner wall of the annular cover 62. The ribs 63 press against the position limiting conical frustum 44, forming a gap 20 between the lower end of the annular cover 62 and the position limiting conical frustum 44 for the entry of external gas, so as to facilitate the entry of external gas into the inner side of the spring 6. When the piston guide 5 is pressed down, the conical frustum sealing part 52 is separated from the side wall of the central hole 41, and the inside of the container cap is communicated with the air outside the spring 6 through the air replenishment channel 31 to replenish a bottle where the pressing pump is located with air. When the piston guide 5 bounces up, a seal is formed between the conical frustum sealing part 52 and the side wall of the central hole 41, isolating the communication between the bottle and the outside, thereby providing good sealing performance.

What is claimed is:

1. An all-plastic pressing pump, comprising: an actuator (1), an insert (2), a housing (3), a container cap (4), a piston guide (5), a pump ball (7), a spring (6), and a protective cover (8), made of plastic, wherein an upper end of the housing (3) is fixed on the container cap (4), a lower end of the piston guide (5) is provided with a slidable sealing part (51) that is inserted into the housing (3) and slidably and sealing connected to an inner wall of the housing (3), the container cap (4) has a central hole (41) for the piston guide (5) to pass through, a conical frustum sealing part (52) is provided on the piston guide (5) above the slidable sealing part (51), the conical frustum sealing part (52), when bounces up, forms a sealed connection with a side wall of the central hole (41), an air replenishment channel (31) communicating an interior of the container cap (4) and an upper port of the housing (3) is disposed between the housing (3) and the container cap (4), the actuator (1) is connected to an upper end of the piston guide (5), a liquid outlet channel (10) leading from the housing (3) to the insert (2) is disposed between the actuator (1) and the piston guide (5), a switch structure is disposed between the actuator (1) and the piston guide (5), the switch structure opens the liquid outlet channel (10) when the actuator (1) is pressed down and blocks the liquid outlet channel (10) when the actuator (1) bounces up, a guide sleeve (42) is provided on the top of the container cap (4) and is upwardly sleeved on an outer side of the actuator (1), an inward-protruding anti-off protrusion (43) is provided at an upper end of the guide sleeve (42), the actuator (1) is provided with an anti-off hook (11) that protrudes outward and is capable of being hooked on the anti-off protrusion (43) when pulled upwards, the protective cover (8) is covered on outer sides of the guide sleeve (42) and the actuator (1) and is in snap-fit with the outer side of the guide sleeve (42), the spring (6) is disposed inside the guide sleeve (42) and is pressed between the top of the actuator (1) and the top of the container cap (4), the spring (6) is a plastic spring tube with open upper and lower ends and a sealed side, and the plastic spring tube has a spiral structure, rotating in a left or right direction;

wherein an upper end of the spring (6) is provided with an annular opening (61), and a lower end of the spring is provided with a downward-facing annular cover (62), the actuator (1) is provided with a position limiting post (16) that is inserted into the annular opening (61) to restrict a lateral movement of the upper end of the spring (6), and the container cap (4) is provided with a position limiting conical frustum (44) for buckling the annular cover (62) on an outer side of the position limiting conical frustum to restrict a lateral movement of the lower end of the spring (6); and wherein a plurality of inward-protruding ribs (63) are circumferentially provided on an inner wall of the annular cover (62), and the ribs (63) press against the position limiting conical frustum (44), to form a gap between a lower end of the annular cover (62) and the position limiting conical frustum (44) for entry of external gas.

2. The all-plastic pressing pump according to claim 1, characterized in that the actuator (1) is provided with a hollow plug connecting rod (12) and a socket (13) located outside the plug connecting rod (12), the plug connecting rod (12) is inserted into the piston guide (5) and slidably and sealing connected to an inner wall of the piston guide, a pull rod (53) is fixed within the piston guide (5) and is inserted into the plug connecting rod (12), the switch structure comprises an inverted conical frustum piston (54) disposed at an upper end of the pull rod (53), an inward-protruding convex ring (14) is provided within the plug connecting rod (12), an outward-flipped inverted conical flanging (55) is provided at the upper end of the piston guide (5), the inverted conical flanging (55) is inserted into the socket (13) and is capable of moving up and down within the socket (13), the socket (13) is provided therein with an annular convex strip (15) that is capable of preventing the inverted conical flanging (55) from falling off the socket (13) from below; when the actuator (1) bounces up, the convex ring (14) is stuck under the inverted conical frustum piston (54) to form a seal, and the annular convex strip (15) is stuck under the inverted conical flanging (55) to form a seal; during a process of pressing down the actuator (1), the actuator (1) moves downwards and causes the convex ring (14) to detach from the inverted conical frustum piston (54) to open the liquid outlet channel (10), and after the actuator (1) moves downward for a certain distance, the actuator presses against the inverted conical flanging (55) to push the piston guide (5) to move downwards together.

3. The all-plastic pressing pump according to claim 2, is characterized in that the convex ring (14) is formed at a vertical junction between an inverted conical frustum bore and a conical frustum bore, wherein the inverted conical frustum bore and the conical frustum bore are vertically connected.

4. The all-plastic pressing pump according to claim 1, is characterized in that a pump ball seat (32) for installing the pump ball (7) is disposed within the housing (3), and a plastic diptube (9) is connected below the housing (3).

* * * * *